United States Patent
Rius Suñé et al.

(10) Patent No.: US 11,407,642 B2
(45) Date of Patent: Aug. 9, 2022

(54) METHOD FOR EXFOLIATING AND TRANSFERRING GRAPHENE FROM A DOPED SILICON CARBIDE SUBSTRATE TO ANOTHER SUBSTRATE

(71) Applicants: CONSEJO SUPERIOR DE INVESTIGACIONES CIENTÍFICAS (CSIC), Madrid (ES); CENTRO DE INVESTIGACIÓN BIOMEDICA EN RED (CIBER), Madrid (ES)

(72) Inventors: Gemma Rius Suñé, Barcelona (ES); Philippe Godignon, Barcelona (ES); Rosa Villa Sanz, Barcelona (ES); Elisabet Prats Alfonso, Madrid (ES)

(73) Assignees: CONSEJO SUPERIOR DE INVESTIGACIONES CIENTÍFICAS (CSIC), Madrid (ES); CENTRO DE INVESTIGACIÓN BIOMEDICA EN RED (CIBER), Madrid (ES)

(*) Notice: Subject to any disclaimer, the term of this patent is extended or adjusted under 35 U.S.C. 154(b) by 587 days.

(21) Appl. No.: 16/474,282

(22) PCT Filed: Dec. 27, 2017

(86) PCT No.: PCT/ES2017/070851
§ 371 (c)(1),
(2) Date: Sep. 30, 2019

(87) PCT Pub. No.: WO2018/122433
PCT Pub. Date: Jul. 5, 2018

(65) Prior Publication Data
US 2020/0031675 A1    Jan. 30, 2020

(30) Foreign Application Priority Data

Dec. 28, 2016 (ES) .............................. ES201631701

(51) Int. Cl.
*C01B 32/19* (2017.01)
*C01B 32/956* (2017.01)
(Continued)

(52) U.S. Cl.
CPC ............ *C01B 32/19* (2017.08); *C01B 32/956* (2017.08); *C25D 9/04* (2013.01); *B82Y 30/00* (2013.01); *B82Y 40/00* (2013.01); *C01P 2002/82* (2013.01)

(58) Field of Classification Search
CPC ..... C01B 32/19; C01B 32/956; C01B 32/194; C01B 32/182; C01B 32/198;
(Continued)

(56) References Cited

U.S. PATENT DOCUMENTS

| | | | | |
|---|---|---|---|---|
| 9,169,575 | B1* | 10/2015 | Bedworth | ......... H01L 21/02527 |
| 2014/0030857 | A1* | 1/2014 | Lee | ....................... C01B 32/186 438/158 |
| 2014/0130972 | A1* | 5/2014 | Ren | ....................... C01B 32/194 156/249 |

OTHER PUBLICATIONS

Lockhart de la Rosa, et al., Frame assisted H2O electrolysis induced H2 bubblying transfer of large area graphene grown by chemical vapor deposition on Cu, Appl. Phys. Lett. 2013; 102(2): 022101-1 to 022101-4 (Year: 2013).*

(Continued)

*Primary Examiner* — Daniel C. McCracken
(74) *Attorney, Agent, or Firm* — Hayes Soloway P.C.

(57) ABSTRACT

The present invention refers to a method for exfoliating and transferring graphene from a doped silicon carbide substrate to another substrate, the method being based on exfoliation induced by hydrogen bubbles produced in the electrolysis of water.

12 Claims, 4 Drawing Sheets

(51) Int. Cl.
*C25D 9/04* (2006.01)
*B82Y 30/00* (2011.01)
*B82Y 40/00* (2011.01)

(58) Field of Classification Search
CPC ............ C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C25D 9/04; B82Y 30/00; B82Y 40/00; C01P 2002/82; Y02E 60/36; C25B 1/00; C25B 1/04; H01B 1/04
See application file for complete search history.

(56) References Cited

OTHER PUBLICATIONS

Gao, et al., Repeated growth and bubbling transfer of graphene with millimeter-size single-crystal grains using platinum, Nature Communications 2012; 3(699): 1-7 (Year: 2012).*

Chen, et al., "Progress and Challenges in Transfer of Large-Area Graphene Films", Advanced Science, Wiley-VCH Verlag GmbH & Co., vol. 3, Issue 8, Aug. 2016, 15 pages.

de la Rosa et al., "Frame assisted H2O electrolysis induced H2 bubbling transfer of large area graphene grown by chemical vapor deposition on Cu", AIP Applied Physics Letters, vol. 102, Issue 2, Jan. 15, 2013, 5 pages.

Gao et al., "Repeated growth and bubbling transfer of graphene with millimetre-size single-crystal grains using platinum", Nature Communications, Nature Communications, vol. 3, Article No. 669, Feb. 29, 2012, 7 pages.

Lee et al., "Raman Spectra of Epitaxial Graphene on SiC and of Epitaxial Graphene Transferred to SiO2" Nano Letters, vol. 8, No. 12, Jul. 18, 2009, pp. 4320-4325, 6 pages.

Kim et al., "Large-scale pattern growth of graphene films for stretchable transparent electrodes", Nature Letters, Macmillan Publishers Limited, vol. 457, Feb. 5, 2009, 5 pages.

Li et al., "Transfer of Large-Area Graphene Films for High-Performance Transparent Conductive Electrodes", Nano Letters, American Chemical Society, vol. 9, No. 12, Aug. 11, 2009, pp. 4359-4363, 5 pages.

Wang et al., "Electrochemical Delamination of CVD Grown Graphene Film: Toward the Recyclable Use of Copper Catalyst", Department of Chemistry, National University of Singapore, ACS Nano, vol. 5, No. 12, Sep. 27, 2011, pp. 9927-9933, 7 pages.

* cited by examiner

METHOD FOR EXFOLIATING AND TRANSFERRING GRAPHENE FROM A DOPED SILICON CARBIDE SUBSTRATE TO ANOTHER SUBSTRATE

The present invention refers to a method for exfoliating and transferring graphene from a doped silicon carbide substrate to another substrate, the method being based on exfoliation induced by hydrogen bubbles produced in the electrolysis of water.

Therefore, the present invention is understood to be set in the area of nanotechnology, within the micro and nanoelectronics industry, as well as in the application fields of optics and photonics.

STATE OF THE ART

The properties of conduction and transport of charge carriers, such as electrons, presented by graphene have represented a technological revolution in diverse fields of industrial application such as optics, photonics, as well as micro- and nanoelectronics in particular, specifically for the industry dedicated to the manufacture of electronic devices and sensors.

The two preferred strategies for the preparation of high crystallinity graphene, and of technological relevance for its industrial adoption, are chemical vapor deposition, shortened as CVD, and epitaxial graphene on silicon carbide (EG-SiC), by a process based on the preferential sublimation of atomic silicon at high temperatures. CVD graphene is synthesised in catalytic substrates such as metals (Cu, Ni, Pt, etc.), and although it stands out for a good cost-quality ratio, it typically requires its transfer to a certain substrate, such as an insulating-type substrate. EG-SiC is valued for its immediate availability (readiness) for the manufacture of electronic devices, such as transistors. However, the use of SiC wafers as a substrate, and the processing itself implies a higher cost for the application of graphene in comparison with silicon-based substrates. EG-SiC stands out especially for its quality, becoming comparable for example in carrier mobility with that of graphene extracted from natural or synthetic graphite crystals (pristine graphene). In this case, a monolayer of graphite, graphene, can be obtained by adhesive tape and manual handling. However, this type of processing is not scalable, nor easily controlled, and therefore, it is hardly viable at the industrial level.

Taking the above into account, the exfoliation and transfer of high crystalline quality graphene, for example from one substrate to another, is a fundamental processing step to allow that graphene can be widely used in devices of the different application fields mentioned above, and at an industrial level.

Different methods of exfoliating and transferring graphene from one substrate to another can be found in the literature. Among them there is the electrochemical method that uses $H_2$ bubbles produced in the electrolysis of water to separate graphene from its starting substrate. In this electrochemical method, the starting substrate-graphene system is used, which is commonly graphene grown by CVD deposited on the catalytic layer of metal, as a cathode or anode of an electrochemical cell where the electrolysis of water is carried out, and a second, commercial-type electrode, for example. By applying a potential difference between the electrodes of the cell and thanks to the $H_2$ bubbles in the graphene-substrate interface derived from the electrolysis of water, the starting substrate is separated from the graphene.

Patent EP2719797B1 describes this electrochemical method of transferring graphene from a metal or semiconductor substrate to another substrate, wherein a polymeric substrate is used as a transfer substrate deposited in the metallic or semiconductor substrate to provide the system with stability during its transfer, so that a final dissolution step for dissolving said polymer is necessary. In this type of procedures, the starting substrate does not readily separate from graphene, so it is necessary to apply some additional traction to separate them, and it is also a complex and expensive method.

Other starting systems for the method of electrolysis, as well as the transfer substrate described above, require multiple layers of graphene at both sides of a single substrate or several different substrates (WO2016071780A1). Again, this type of process needs more traction for its separation in addition to a prior hydrogenation step, and they are complex and expensive processes.

Furthermore, there are other methods such as the one in patent application WO2011025671A1, which describes an electrochemical method for transferring graphene from one substrate to another which incorporates an adhesive layer between the layer of graphene and the transfer polymeric layer to facilitate traction during separation of the graphene from the starting substrate. However, this adhesive layer induces the breakage of the graphene layer, substantially decreasing the grain size of the transferred graphene with respect to the original.

Therefore, it is necessary to develop simple and effective transfer methods for subsequent applications of transferred graphene and maintaining the high crystalline quality properties of the initial graphene.

DESCRIPTION OF THE INVENTION

The present invention provides the transfer of graphene from a doped silicon carbide (SiC) substrate to another substrate by mechanical separation or exfoliation of layers of graphene of the SiC substrate, which originally acts as a support and precursor in the epitaxial growth of graphene itself and based on the decomposition of which graphene has grown (SiC as a precursor of atomic C thanks to the preferential desorption of atomic Si at high temperatures). This separation of graphene and SiC is induced by an electrochemical method, specifically the formation of $H_2$ bubbles in the graphene-SiC interface by the electrolysis of water. An adjustment of the minimum voltage to induce the separation allows maintaining the high crystalline quality of the initial epitaxial graphene. By means of this process, exfoliation is achieved only with bubbling without having to apply mechanical traction, assisted, for example, by ultrasound, agitation or other methods described in the state of the art, or manual mechanical traction. In addition, the method of the invention is simpler than in other reported methods for epitaxial graphene in SiC since exfoliation occurs in a single step, that is to say, without the need for previous hydrogenation or multilayer deposition, as used in the other mechanical pickling methods mentioned.

As an added value, the doped SiC substrates used in the present invention are more economical than the semi-insulating SiC substrates conventionally used for graphene deposition methods. The method of the invention is quite versatile, so it is applicable to a wide variety of available doped SiC substrates and in which epitaxial graphene growth is applied on a regular basis. Additionally, the SiC substrate is reusable after exfoliation of graphene.

Furthermore, the method of the invention and experimental configuration is easily scalable, besides fast and ecologically sustainable, especially compared to CVD graphene, for which, if an electrochemical exfoliation method is not applied, typically the engraving of the metal sheets (catalyst and support) is used with solutions such as $FeCl_3$, in a treatment that lasts for hours (approximately proportional to the thickness of the metal to be engraved).

Therefore, in a first aspect, the present invention relates to a method for exfoliating and transferring graphene deposited on one substrate (hereinafter the method of the invention), which consists of a layer of doped SiC, to another substrate, characterised in that it comprises the following steps:
a) obtaining at least one system comprising
   graphene
   the layer of doped SiC
   and a polymeric layer,
   wherein the graphene is deposited between the layer of doped SiC and the polymeric layer,
b) applying a potential between the cathode and the anode of an electrochemical cell between 6 V and 20 V;
   wherein the system obtained in step (a) acts as a cathode and a reference electrode, preferably of platinum, acts as an anode, and
   wherein the electrolytic solution of said electrochemical cell comprises water and an electrolyte;
c) depositing the system obtained in step (b) comprising the graphene deposited in the polymeric layer, on the substrate of interest, wherein the graphene is deposited between the polymeric layer and the substrate of interest; and
d) removing the polymeric layer from the system obtained in the step by dissolution,
   with the condition that the substrate of interest is insoluble in the dissolution of step (d).

In step (a) of the method of the invention, to obtain the system comprising:
graphene
the layer of doped SiC
and a polymeric layer,
the polymeric layer, which acts as a transfer substrate, is deposited on the graphene previously grown in doped SiC.

In a preferred embodiment, in step (a) of the method of the invention, at least one system is obtained, which comprises
graphene
the layer of doped SiC
and a polymeric layer, and which in turn comprises the following sub-steps:
(a1) obtaining graphene deposited in the doped SiC substrate by thermal decomposition of the SiC crystal into its chemical elements (Si and C), comprising the following steps:
   (i) removing impurities from the surface of the doped SiC substrate, and
   (ii) heat treating the substrate obtained in (i) under vacuum and at a temperature between 1300° C. and 2000° C. for a time between 0.5 h and 2 h; and
(a2) depositing a polymeric layer on the graphene obtained in (a1).

In the heat treatment step (ii), under these conditions, graphene (formed by one or several layers) typically covers the entire SiC surface processed. As a result of the decomposition of the SiC substrate, whereby the deposition of graphene is made possible, the surface of the SiC substrate is reconstructed as characteristic terraces having a typical width between hundreds of nanometres up to one/two microns; the length of the terraces is greater than several millimetres. The steps are of variable height, between about 10-100 nm. The layer/layers of graphene covers/cover the topography of the SiC surface in a conformal and continuous manner in the steps. Through this process, epitaxial graphene grown on doped SiC is obtained.

"Layer of doped SiC" or "doped SiC substrate" is understood in the present invention to mean doped SiC substrates, preferably with boron, aluminum or nitrogen atoms, to modify its band structure, that is, to generate additional levels between the valence band and the conduction band. With high doses of doping, metallic conduction can be achieved. In a preferred embodiment the substrates are SiC substrates doped with nitrogen.

This type of doped SiC substrates, i.e., conductive substrates, are significantly more economical than SiC substrates of the semi-insulating type for the epitaxial growth of graphene. A broad range of SiC substrate types can be used and are known to any person skilled in the art, such as, for example, without being limited to, SiC polytypes (6H, 3C, etc.) or other orientations (for example axial section). More preferably the substrate is of the doped 4H SiC polytype.

In the present invention, the term "at least one system" refers to the system consisting of at least one substrate, doped silicon carbide, on which the graphene is deposited, the graphene itself and a transfer substrate (the polymeric layer), since by using the other side of the substrate on which the graphene is deposited, or different geometries thereof, other substrate-graphene-substrate systems could be generated simultaneously.

The polymeric layer used in the system described in step (a) is what has been called transfer substrate, useful for the next exfoliation step (b) and subsequent transfer to a new substrate. In a preferred embodiment, the polymeric layer is selected from polymethyl methacrylate (PMMA), polyethylene terephthalate (PET), polyethylene (PE), polyphenyl ether (PPE) and any combinations thereof.

In the present invention, for depositing the polymeric layer which is used as the transfer substrate, any method known to a person skilled in the art can be used, in a preferred embodiment the spin coating method is used, which is the most widespread technique for depositing polymeric layers of controlled thickness (in this range from nm to microns in thickness). This polymeric layer is intended to be between 100 nm and 800 nm thick, because with a thinner thickness in the transfer the breakage of the layer of graphene may occur, and with a larger size it may cause the stripping of the graphene-polymeric layer system to be more expensive.

In the exfoliation step (b) of the method of the present invention the substrate system of doped silicon carbide-graphene-transfer substrate is used as a cathode, and a reference electrode is used as an anode. It is at the anode where hydrogen bubbles produced by the electrolysis of water occurs.

In a preferred embodiment of step (b) of the method of the invention, the applied potential is between 10 V and 13 V, preferably for a time less than 10 minutes.

As an electrolyte for the electrolytic solution, it can be selected from an acid, a base and a salt, and preferably a base is used, and more preferably the base is NaOH or KOH.

In the present invention, "electrolyte" is understood as any solution charged with ions, which includes bases, acids or salts, and which provides the element necessary for generating $H_2$ for exfoliating graphene. Among the bases, NaOH and KOH are preferred because they leave a smaller amount of residues and do not etch graphene.

In this way, in the electrochemical cell of step (b), it is formed by:
- one pair of electrodes: the reference electrode, preferably of platinum (anode) and the electrode consisting in the substrate system SiC-graphene-transfer substrate (cathode);
- an aqueous electrolytic solution comprising an electrolyte that can be selected from an acid, a base and a salt, preferably a base, even more preferably the base is NaOH or KOH; and
- an external power source, which applies a potential difference between the electrodes, preferably between 10 and 13 V, which causes water electrolysis and sufficient bubbling at the graphene-SiC interface to break the bond or overcome the cohesion forces at the interface. The separation occurs (requires) from 30 seconds to 10 minutes of bubbling.

In step (c) of the method of the invention, the system obtained in step (b), comprising the graphene deposited in the polymeric layer, is deposited on the substrate of interest, wherein the graphene is deposited between the polymeric layer and the substrate of interest. This deposition step can be carried out manually.

In the present invention the term "substrate of interest" refers to the target substrate or final substrate on which the graphene formerly grown in doped SiC is to be transferred. This substrate can be made out of any nature and the selection thereof will depend on the type of final application of said graphene, however, said final substrate cannot be formed by a material that dissolves in the same solvent used in step (d) of the method of the invention for the dissolution of the transfer substrate that is used in step (a).

The substrate of interest may be a metallic substrate, such as for example, without being limited to Cu, Ni, Mo, Ni, or any combinations thereof, or it can be a dielectric substrate, such as for example, without being limited to MgO, $SiO_2$, Si on $SiO_2$, $Al_2O_3$, among others, as well as other morphological/structural characteristics such as flexible substrates, transparent substrates, micro-structured substrates, porous substrates, etc.

In another preferred embodiment, the solvent used in the solution of step (d) is selected from a polar aprotic solvent, more preferably it can be selected from acetone, dimethyl sulfoxide, or any combinations thereof, and a protic polar solvent, such as ethanol, isopropanol or any combinations thereof. More preferably a sequence formed by acetone followed by a rinsing in isopropanol is used.

In another embodiment of the method of the present invention, the product obtained in step (d) is subsequently rinsed with water.

Throughout the description and the claims, the word "comprises" and its variants are not intended to exclude other technical features, additives, components or steps. For those skilled in the art, other objects, advantages and features of the invention may be inferred from both the description and the embodiment of the invention. The following examples and figures are provided by way of example and are not intended to limit the present invention.

EXAMPLES

The invention is illustrated below by means of assays conducted by the inventors that demonstrate the effectiveness of the method of the invention.

Preparation of the Samples

First a pre-treatment of a highly doped substrate (n+) of 4H—SiC was carried out, that is to say, the cleaning and removal of native oxide from substrates. Highly doped commercial SiC (Intrinsic SC) was used in the present invention. SiC is a wide-bandgap semiconductor type material, 3.23 eV for 4H—SiC. SiC can be doped intentionally to modify its band structure, that is, to generate additional levels between the valence band and the conduction band. With high doses of doping, for example with boron atoms, aluminum or nitrogen atoms, metallic conduction can be achieved. In the present example a substrate highly doped with nitrogen (n+) of 4H—SiC is used, with a resistivity of ~0.05 ohm/$cm^2$.

The initial substrates are samples of 1.4×1.4 $cm^2$ cut from a 5.08 centimetre (2 inches) wafer.

Figure 1:
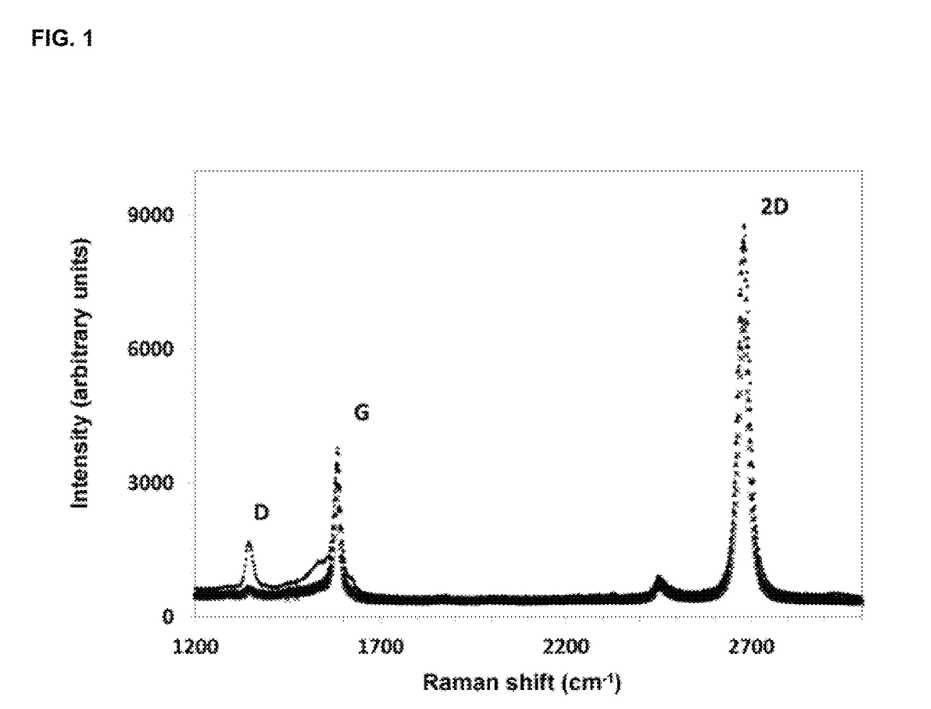
FIG. 1 Three-dimensional representation of the topography characterisation of the SiC surface completely covered with epitaxial graphene. It corresponds to the sample used for the experiment described in FIG. 1, corresponding to graphene exfoliated with the electrochemical method and transferred to $SiO_2$ substrate. The image has been taken with an atomic force microscope, corresponds to the so-called topography signal, and sweeps an area of 1.7×1.7 $\mu m^2$.

The graphene growth was then carried out by decomposition at a high temperature. The epitaxial growth of a few layers of graphene was performed on the Si face of 4H—SiC. The cut of the wafers with respect to the crystalline planes of the SiC is of the off-axis type (4°). The growth was carried out at a high temperature, at a temperature of 1850° C. and under vacuum. Under these conditions, graphene covers the entire SiC surface doped with nitrogen. It should be noted that the substrate itself is also the source of atomic C and therefore the precursor of graphene. As a result of the decomposition of SiC substrate doped with nitrogen, the surface of the SiC substrate is reconstituted forming characteristic graphene terraces of typical width between hundreds of nanometres up to 1-2 microns; the length of the terraces is greater than several millimetres, typically greater than 3 mm based on the determination with optical microscopy. The steps are of variable height, between about 10-100 nm. The layers of graphene cover the topography of the SiC surface doped with nitrogen in a conformal and continuous manner in the steps (FIG. 1).

For transfer handling, a thin polymeric layer covering the graphene previously obtained was used. A commercial product (MicroChem) of polymethyl methacrylate was used, PMMA 950 MW available in solution that was deposited on the face of graphene by the spin coating method. When deposited at a spinning speed of 1500 rpm, the nominal thickness of the polymeric layer is 800 nm thick.

Method for Transferring Graphene from One Substrate to Another

The separation of the graphene and the substrate was induced by the formation of $H_2$ bubbles at the graphene-SiC doped with nitrogen interface. $H_2$ bubbles are formed in the electrolysis of water according to:

$$2H_2O(l) + 2e^- \rightarrow H_2(g) + 2OH^-(aq) \text{ Cathode } E°_{red} = -0.828V$$

$$O_2(g) + 2H_2O + 4e^- \rightarrow 4OH^-(aq) \text{ Anode } E°_{red} = 0.401V$$

The electrochemical cell where the electrolysis of water was carried out was formed by a pair of electrodes: a platinum reference electrode (anode) and an electrode consisted in the sample, that is to say, by the PMMA-graphene-SiC system doped with nitrogen (cathode) described in the previous section. The electrochemical solution was made up of an aqueous solution containing 0.25 M NaOH. With an external source, a potential difference of between 10 V and 13 V between the electrodes was applied, which caused the electrolysis of water and sufficient bubbling at the graphene-SiC interface to break the bond or overcome the cohesion forces at the interface. The separation occurred between 30 seconds and 10 minutes of bubbling.

Once the PMMA-graphene bilayer is dettached, it is manually transferred to an $SiO_2$ on silicon substrate with tweezers. The PMMA, which formed the support layer, was removed by an acetone bath followed by a bath in isopropanol, and then a rinse was carried out in pure water.

The verification and structural analysis of graphene transferred to $SiO_2$ was performed by Raman spectroscopy.

Figure 2:
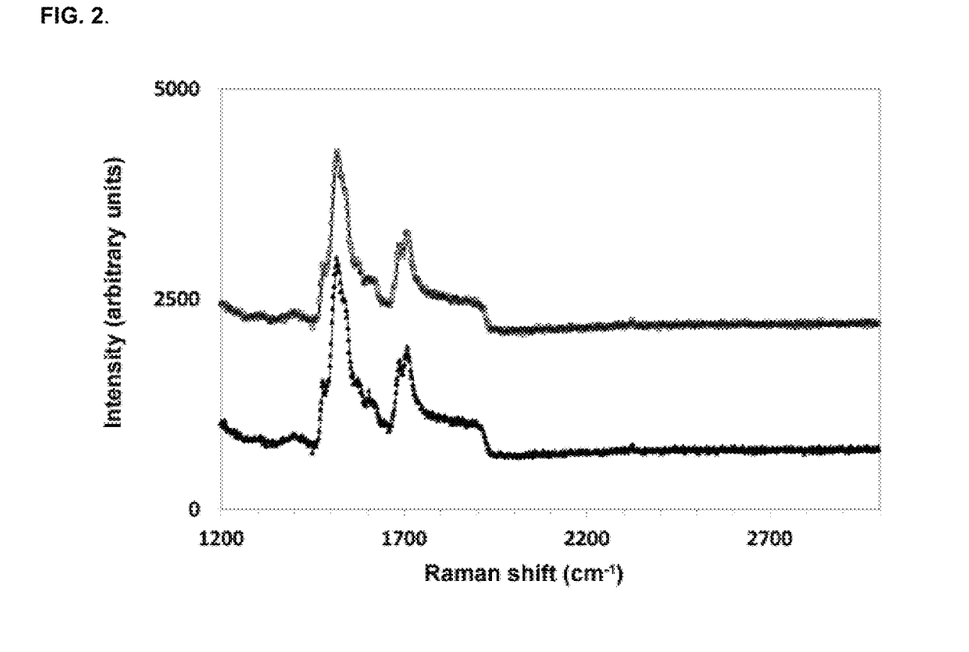
FIG. 2 Raman spectra in three different positions of the same sample for graphene that is exfoliated and transferred to an $SiO_2$ substrate once the layer of PMMA has been removed in the acetone and isopropanol bath.

FIG. 2 shows the Raman spectrum obtained for the system formed by a layer of graphene in physical contact with the support layer of PMMA. Specifically, the distinctive Raman G band (~1585 cm$^{-1}$) and 2D band (~2690 cm$^{-1}$) of graphitic materials can be observed. The characteristics of the peaks of the three spectra indicate that it is monolayer type graphene: ratio of intensities between the 2D and G peaks greater than one and 2D peak with a profile that can be fit to a single Lorentzian equation with full width at half height (FWHM) ~35 cm$^{-1}$. As demonstrated by the structural characterisation by Raman spectroscopy of the graphene material, the membrane of transferred material is of a high crystalline quality. The eventual presence of the D peak is relatively common in this type of polymeric layer-assisted transfer techniques. It is attributed, for example, to polymer residues or structural stress due to an imperfect planarisation (presence of wrinkles, folds, corrugation, etc).

Figure 3:
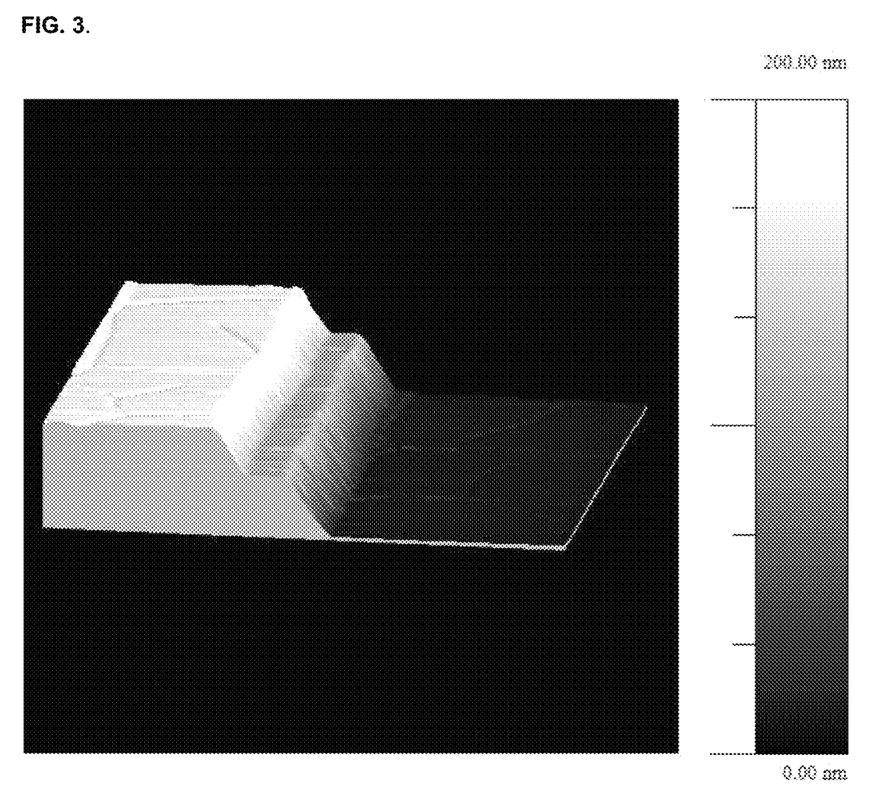
FIG. 3 Two Raman spectra of the remaining SiC substrate doped with nitrogen, when the present electrochemical bubbling technique is applied to separate the epitaxial graphene from the substrate.

FIG. 3 shows the Raman spectrum of the substrate remaining after exfoliation, which consists of SiC doped with nitrogen, where only the characteristic peaks of the SiC crystal are observed. In the displayed frequency range (1200 cm$^{-1}$ to 3000 cm$^{-1}$), the resonant bands of the SiC crystal at 1516 cm$^{-1}$, 1705 cm$^{-1}$ and 1711 cm$^{-1}$ stand out. No graphene is detected since the G and 2D bands of graphene are not present. Since the characteristic G and 2D bands of graphene are not present, an efficient/effective exfoliation of graphene is included/demonstrated.

This includes the complete pickling of the layer(s) of graphene, in the order of the chip/substrate area, or the exfoliation of graphene tapes. Under the high-temperature atomic silicon sublimation deposition process conditions used for the demonstrator, layers of graphene are obtained covering the entire surface of the SiC doped sample and in a reproducible manner. The epitaxial graphene continuously covers the terraces and steps of SiC (FIG. 4) either by coalescence or superposition of layers of graphene. The pickling materials have a correspondence with the surface morphology determined with atomic force microscopy of epitaxial graphene, insofar as said terraces and steps can be recognised in the transferred graphene.

Figure 4:
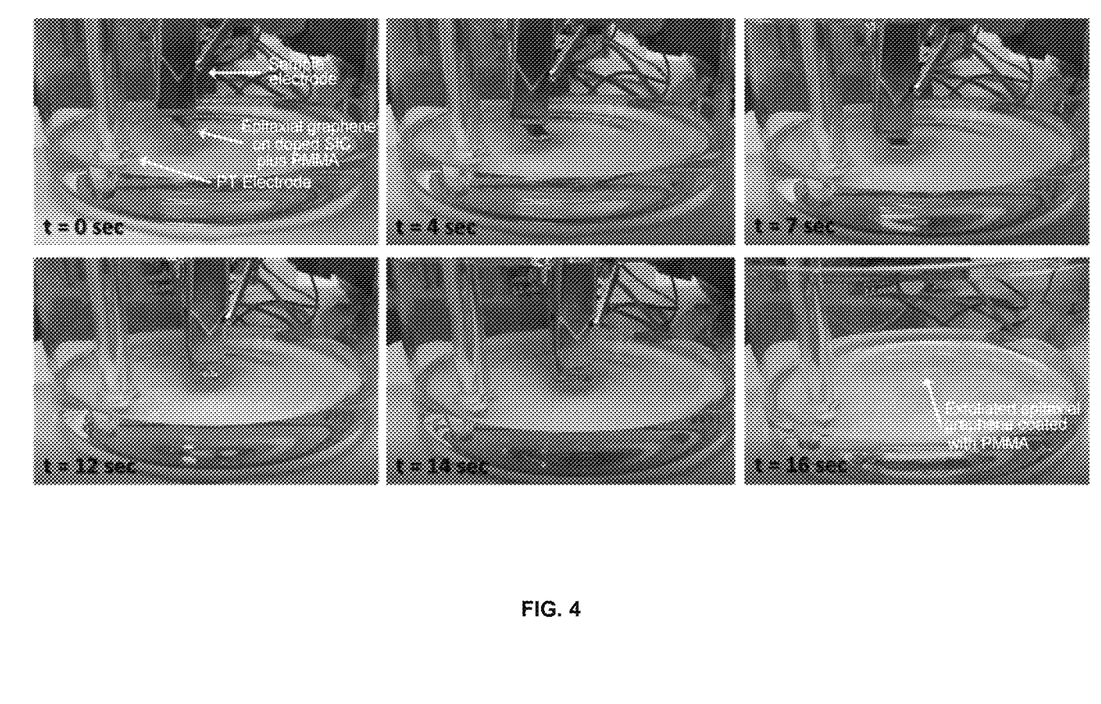
FIG. 4 Sequence of photographs of the electrochemical exfoliation of epitaxial graphene in doped silicon carbide.

FIG. 4 shows a sequence of photographs of the electrochemical exfoliation process of epitaxial graphene in doped silicon carbide. As can be seen in FIG. 4, the dettachment occurs spontaneously in less than 20 seconds and without the help of mechanical traction.

In the case of obtaining transferred graphene tapes, for example, observed by optical microscopy, these have a high ratio in proportions: typical width 300 nm-1.5 µm and length of hundreds of micrometres—a few millimetres, determined by the morpho-structural features of the high-temperature deposition products, and therefore coinciding with the dimensions of the terraces or features of the steps.

Comparative Test 1:

A non-doped PMMA-graphene-SiC system was prepared as indicated above and exfoliation was carried out in the electrolysis conditions described in the previous example. Because non-doped SiC is insulating, the flow of electrical current between the electrodes, which is necessary for electrolysis, and therefore bubbling, does not take place.

The invention claimed is:

1. A method for transferring graphene deposited on a substrate, consisting of a layer of doped silicon carbide, to another substrate characterised in that it comprises the following steps:
   a) obtaining at least one system comprising
      graphene
      the layer of doped silicon carbide
      and a polymeric layer,
      wherein the graphene is deposited between the layer of doped silicon and the polymeric layer,
   b) applying a potential between the cathode and the anode of an electrochemical cell between 6 V and 20 V;
      wherein the system obtained in step (a) acts as a cathode and a reference electrode acts as an anode and
      wherein the electrolytic solution of said electrochemical cell comprises water and an electrolyte;
   c) depositing the system obtained in step (b) comprising the graphene deposited in the polymeric layer, on the substrate of interest, wherein the graphene is deposited between the polymeric layer and the substrate of interest; and
   d) removing the polymeric layer from the system obtained in the step by dissolution;
with the condition that the substrate of interest is insoluble in the dissolution of step (d).

2. The method according to claim 1, wherein the substrate of interest is selected from $SiO_2$, Si on $SiO_2$ and any combinations thereof.

3. The method according to claim 1, wherein the system obtained in step (a) in turn comprises the following steps:
   (a1) obtaining graphene deposited on a doped silicon carbide substrate by chemical decomposition of the silicon carbide crystal, comprising the following steps:
      (i) removing impurities from the surface of the doped silicon carbide substrate, and
      (ii) heat treating the substrate obtained in (i) under vacuum and at a temperature between 1300° C. and 2000° C. for a time between 0.5 h and 2 h; and
   (a2) depositing a polymeric layer on the graphene obtained in (a1).

4. The method according to claim 1, wherein the applied potential between the cathode and the anode in step (b) is between 10 V and 13 V.

5. The method according to claim 1, to wherein the electrolyte used in step (b) in the electrochemical dissolution is selected from an acid, a base or a salt.

6. The method according to claim 5, wherein the electrolyte is a base.

7. The method according to claim 6, wherein the base is NaOH or KOH.

8. The method according to claim 1, wherein the substrate is silicon carbide doped with nitrogen.

9. The method according to claim 1, wherein the polymeric layer of step (a) is selected from polymethyl methacrylate (PMMA), polyethylene terephthalate (PET), polyethylene (PE), polyphenyl ether (PPE) and any combinations thereof.

10. The method according to claim 1, wherein the solvent used in the solution of step (d) is selected from a polar aprotic solvent.

11. The method according to claim 10, wherein the solvent is acetone or acetone followed by isopropanol.

12. The method according to of claim 1, wherein the rinse of the product obtained in step (d) is carried out with water.

* * * * *